US010373614B2

(12) United States Patent
Seksenov et al.

(10) Patent No.: US 10,373,614 B2
(45) Date of Patent: Aug. 6, 2019

(54) WEB PORTAL DECLARATIONS FOR SMART ASSISTANTS

(71) Applicant: Microsoft Technology Licensing, LLC, Redmond, WA (US)

(72) Inventors: Kiril Seksenov, Seattle, WA (US); Avishek Mazumder, Hyderabad (IN); Kevin Hill, Redmond, WA (US); Aditya Pruthi, Waterloo (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 15/373,458

(22) Filed: Dec. 8, 2016

(65) Prior Publication Data

US 2018/0166072 A1 Jun. 14, 2018

(51) Int. Cl.
| | |
|---|---|
| *G10L 15/22* | (2006.01) |
| *H04L 29/08* | (2006.01) |
| *H04L 29/06* | (2006.01) |
| *G06F 16/955* | (2019.01) |

(52) U.S. Cl.
CPC .......... *G10L 15/22* (2013.01); *G06F 16/9558* (2019.01); *H04L 63/083* (2013.01); *H04L 63/0815* (2013.01); *H04L 67/02* (2013.01); *G10L 2015/223* (2013.01); *H04L 63/168* (2013.01)

(58) Field of Classification Search
CPC .... G10L 15/22; G10L 2015/223; G10L 15/30
USPC ................................. 704/235, 270
See application file for complete search history.

(56) References Cited

U.S. PATENT DOCUMENTS

| | | | |
|---|---|---|---|
| 6,157,705 A | 12/2000 | Perrone | |
| 6,473,734 B1 * | 10/2002 | Dvorak | H04M 3/42204 704/235 |
| 8,843,376 B2 | 9/2014 | Cross, Jr. | |
| 9,195,477 B1 * | 11/2015 | Spencer | G06F 8/54 |
| 9,292,252 B2 | 3/2016 | Hardy et al. | |
| 9,652,209 B2 * | 5/2017 | Desineni | G06F 8/53 |
| 9,740,751 B1 * | 8/2017 | Yeom | G06F 17/3053 |
| 2002/0010584 A1 | 1/2002 | Schultz et al. | |
| 2002/0072916 A1 | 6/2002 | Friedman | |
| 2003/0078779 A1 | 4/2003 | Desai et al. | |

(Continued)

FOREIGN PATENT DOCUMENTS

| | | |
|---|---|---|
| CN | 101989299 A | 3/2011 |
| WO | 2002011120 A1 | 2/2002 |

OTHER PUBLICATIONS

Uday, et al., "Voice based Internet Browser", In International Journal of Computer Applications, vol. 66, No. 8, Mar. 2013, pp. 20-22.

*Primary Examiner* — Shaun Roberts
(74) *Attorney, Agent, or Firm* — Arent Fox LLP

(57) ABSTRACT

In one example, an assistant support server may maintain a web portal to crowdsource responses to a user input. The assistant support server may maintain a web portal accessible by a developer device. The assistant support server may store an assistant rule based on a developer input associating an input word set describing a hypothetical user input with a deep link for a website. The assistant support server may receive in the web portal the developer input. The assistant support server may direct a smart assistant module executed by a user device to connect to the deep link in response to receiving a user input from the smart assistant module matching the input word set.

21 Claims, 14 Drawing Sheets

(56) References Cited

U.S. PATENT DOCUMENTS

| | | |
|---|---|---|
| 2003/0125953 A1 | 7/2003 | Sharma |
| 2004/0128136 A1 | 7/2004 | Irani |
| 2004/0141597 A1 | 7/2004 | Giacomelli |
| 2012/0124061 A1* | 5/2012 | Macbeth ................. G06F 9/445 707/749 |
| 2015/0143241 A1 | 5/2015 | Zeigler et al. |
| 2016/0078141 A1 | 3/2016 | Fang |
| 2016/0155442 A1* | 6/2016 | Kannan ................... G06F 3/167 704/275 |
| 2016/0234330 A1* | 8/2016 | Popowitz ............ H04L 67/2814 |

* cited by examiner

| DEV ID 510 | DOMAIN 520 | INPUT WORD SET 530 | | DEEP LINK 540 | ACTION 550 | WEIGHT 560 |
|---|---|---|---|---|---|---|
| DEV WEIGHT 512 | | WORD 532 | WORD 532 | | | |
| | | WEIGHT 534 | WEIGHT 534 | | | |

WEB PORTAL DECLARATIONS FOR SMART ASSISTANTS

BACKGROUND

A user device may execute a smart assistant module to facilitate user access to various applications on the user device. The smart assistant module may coordinate interactions between applications for the user. The smart assistant module may reduce overhead on the user device by offloading the functions of the smart assistant module to an assistant support server accessible via a data network. The smart assistant module may forward a user request to the assistant support server for processing.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to maintaining a web portal to crowdsource responses to a user input. The assistant support server may maintain a web portal accessible by a developer device. The assistant support server may store an assistant rule based on a developer input associating an input word set describing a hypothetical user input with a deep link for a website. The assistant support server may receive in the web portal the developer input. The assistant support server may direct a smart assistant module executed by a user device to connect to the deep link in response to receiving a user input from the smart assistant module matching the input word set.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 5 illustrates, in a block diagram, one example of an assistant rule.

DETAILED DESCRIPTION

Figure 1:
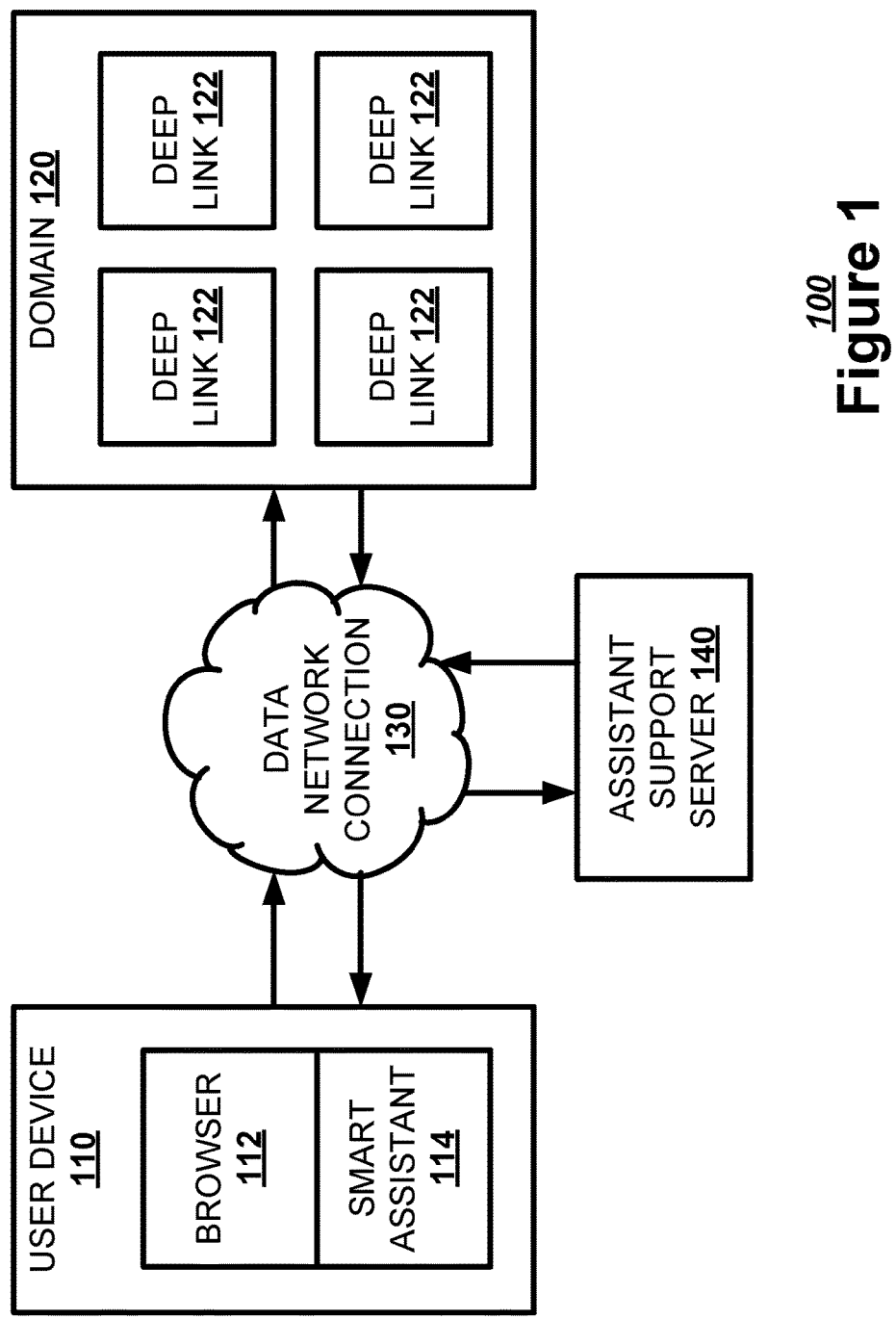
FIG. 1 illustrates, in a block diagram, one example of a data network.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be an assistant support server, a computing device, or a machine-implemented method.

In one example, an assistant support server may maintain a web portal to crowdsource responses to a user input. The assistant support server may maintain a web portal accessible by a developer device. The assistant support server may store an assistant rule based on a developer input associating an input word set describing a hypothetical user input with a deep link for a website. The assistant support server may receive in the web portal the developer input. The assistant support server may direct a smart assistant module executed by a user device to connect to the deep link in response to receiving a user input from the smart assistant module matching the input word set.

A user device may implement a smart assistant module, such as Siri® or Cortana®, to allow a user to interact with the user device to perform a network-enhanced action. A network-enhanced action is an action that incorporates processing or data tasks executed on a different device from the user device, such as finding directions on a mapping application or access an online account. A smart assistant module may connect to an assistant support server via a data network. The smart assistant module may offload various processing tasks of the smart assistant module to the assistant support server, allowing the user device to perform tasks beyond the resource capability of the user device alone. For example, the smart assistant module may process a natural language query from a user, either verbal or textual, by sending the natural language query to the assistant support server.

The assistant support server may have a set of assistant rules describing network-enhanced actions in response to a variety of user inputs. A programmer for the smart assistant module may have difficulty formulating a network-enhanced action for every possible user input. To better develop a comprehensive set of assistant rules, the assistant support server may establish a web portal to crowdsource the development of the assistant rules.

A developer of a website may access the web portal to submit an input word set describing a hypothetical user input. The developer may then propose a network-enhanced action for the browser to execute in response to a user input matching the input word set. Further, rather than proscribing a specific action to the smart assistant module, a developer may specify a deep link on the website to direct the user device to access. The deep link may then perform the network-enhanced action for the user device, further offloading resource draining activities from the user device. The assistant support server may limit application of an assistant rule to when the user has specifically invoked the domain for the website associated with the deep link.

Even when the developer submits just the deep link to access in response to a user input matching the input word set, the assistant support server may extrapolate a network-enhanced action for broader applicability. The smart assistant module may track the actions taken at the deep link in response to a user input. The smart assistant module may then report those actions back to the assistant support server. The assistant support server may then update the assistant rule to reflect the network-enhanced action.

FIG. 1 illustrates, in a block diagram, one example of a data network 100. A user device 110 may implement a browser 112 to access a domain 120 of a website via a data network connection 130. The user device 110 may be a desktop computer, a workstation, a smart phone, a tablet, a smart watch, or other computing device capable of executing a browser 112. The domain 120, such as "jcpenney.com", may be hosted on a server or server farm. The domain 120 may have one or more deep links 122 indicating virtual locations within the domain 120, such as "jcpenney.com/shoes", accessible with the browser 112. The data network connection 130 may be an enterprise network connection, an Internet connection, a wide area network connection, a local area network connection, a mobile telephone network, or other type of data network connection.

The user device 110 may execute a smart assistant module 114, such as Siri® or Cortana®, to coordinate user access to the applications of the user device 110, such as the browser 112. The smart assistant module 114 may connect to an assistant support server 140 via the data network connection 130. The smart assistant module 114 may offload specific functions to the assistant support server 140 to increase the processing, data, and memory resources available to the user device 110. The smart assistant module 114 may receive a user input from the user. The user input may be a verbal input received via a microphone or a text input received via a hardware keypad or a virtual keypad. The smart assistant module 114 may forward the user input to the assistant support server 140 for processing. The assistant support server 140 may convert a verbal input into a text input. The assistant support server 140 may determine the intent of the user input to generate an appropriate response. The assistant support server 140 may consult an assistant rule proscribing an action for the smart assistant module 114 to take in response to a specified user input. The assistant support server 140 may generate a user directive to send to the smart assistant module 114 proscribing the action for the smart assistant module 114. The smart assistant module 114 may receive the user directive and perform the action based on the user directive.

Figure 2:
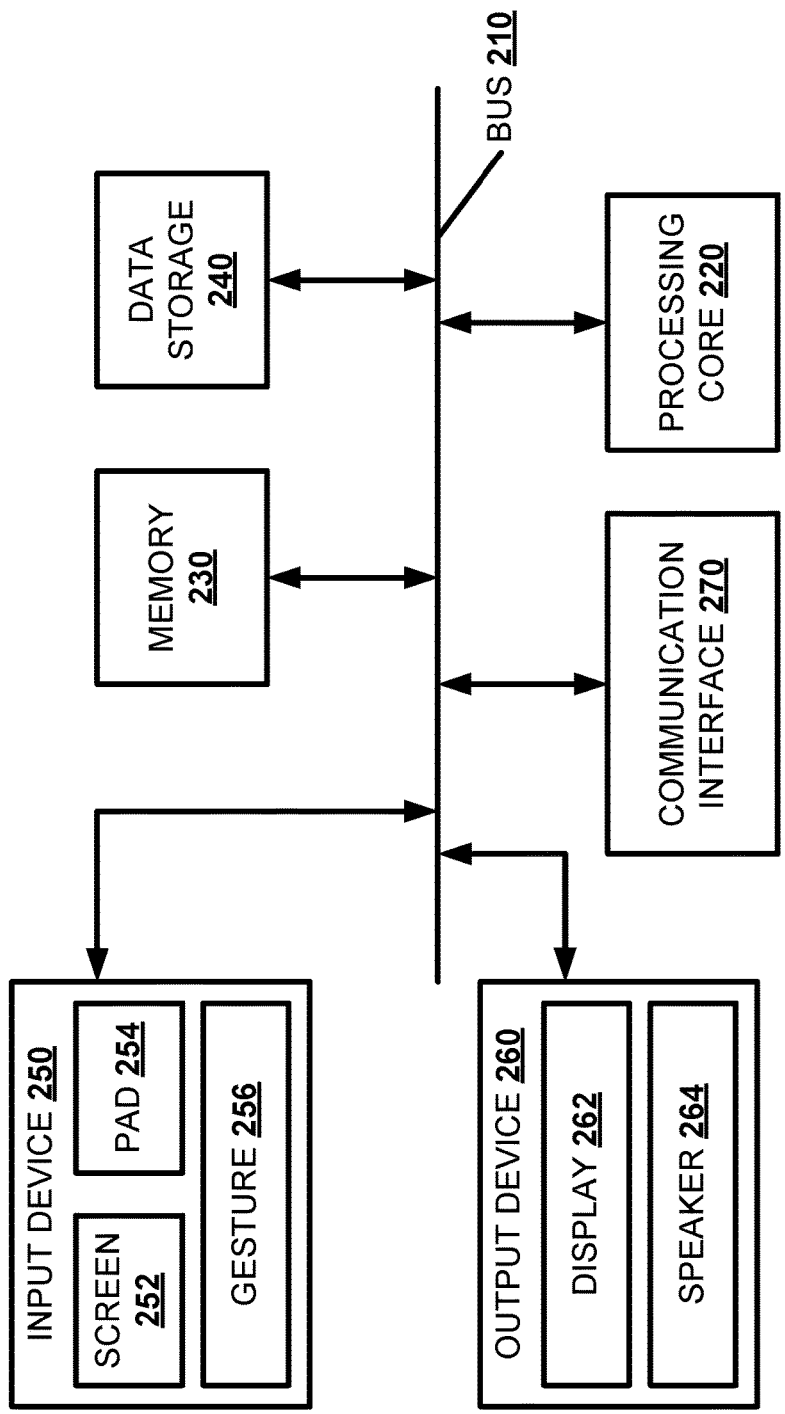
FIG. 2 illustrates, in a block diagram, one example of a computing device.

FIG. 2 illustrates a block diagram of an exemplary computing device 200 which may act as an assistant support server or a user device. The computing device 200 may combine one or more of hardware, software, firmware, and system-on-a-chip technology to implement an assistant support server or a user device. The computing device 200 may include a bus 210, a processing core 220, a memory 230, a data storage 240, an input device 250, an output device 260, and a communication interface 270. The bus 210, or other component interconnection, may permit communication among the components of the computing device 200.

The processing core 220 may include at least one conventional processor or microprocessor that interprets and executes a set of instructions. The processing core 220 may be configured to maintain a web portal accessible by a developer device. The processing core 220 may be further configured to authenticate a developer identifier associated with a website. The processing core 220 may be also configured to generate a rule weight based on a developer weight. The processing core 220 may be additionally configured to adjust a rule weight based on at least one of a user response and a secondary developer proposal. The processing core 220 may be further configured to convert a verbal user input from a user device to a text user input. The processing core may be also configured to parse a domain identified in the user input. The processing core 220 may be additionally configured to calculate a confidence score based on a comparison of the user input and the input word set.

The memory 230 may be a random access memory (RAM) or another type of dynamic data storage that stores information and instructions for execution by the processing core 220. The memory 230 may also store temporary variables or other intermediate information used during execution of instructions by the processing core 220. The memory 230 may be configured to store an assistant rule based on a developer input associating an input word set describing a hypothetical user input with a deep link for a website. The memory 230 may be further configured to associate a domain for the website with a developer identity. The memory may be also configured to associate a developer identifier with a developer weight indicating relative prominence of the developer. The memory 230 may be additionally configured to associate the assistant rule with a rule weight describing a rule applicability likelihood. The memory 230 may be further configured to associate a network-enhanced action performed by the deep link with the input word set in the assistant rule.

The data storage 240 may include a conventional ROM device or another type of static data storage that stores static information and instructions for the processing core 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing an assistant rule.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. The output device 260 may include one or more conventional mechanisms that output information to the user, including a display screen 262, a printer, one or more speakers 264, a headset, a vibrator, or a medium, such as a memory, or a magnetic or optical disk and a corresponding disk drive.

The communication interface 270 may include any transceiver-like mechanism that enables computing device 200 to communicate with other devices or networks. The communication interface 270 may include a network interface or a transceiver interface. The communication interface 270 may be a wireless, wired, or optical interface. The communication interface 270 may be configured to receive a login credential associated with a website from a developer device. The communication interface 270 may be further configured to receive in a web portal a developer input. The communication interface 270 may be also configured to receive a user input from the user device. The communication interface 270 may be additionally configured to send a user directive to instruct a smart assistant module executed by a user device to connect to a deep link of the website in response to receiving a user input from the smart assistant module matching an input word set. The communication interface 270 may be further configured to receive a user report to track at the deep link a network-enhanced action performed in response to the user input. The communication interface 270 may be also configured to send a user directive to instruct the smart assistant module to perform a network-enhanced action in response to the user input.

The computing device 200 may perform such functions in response to processing core 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
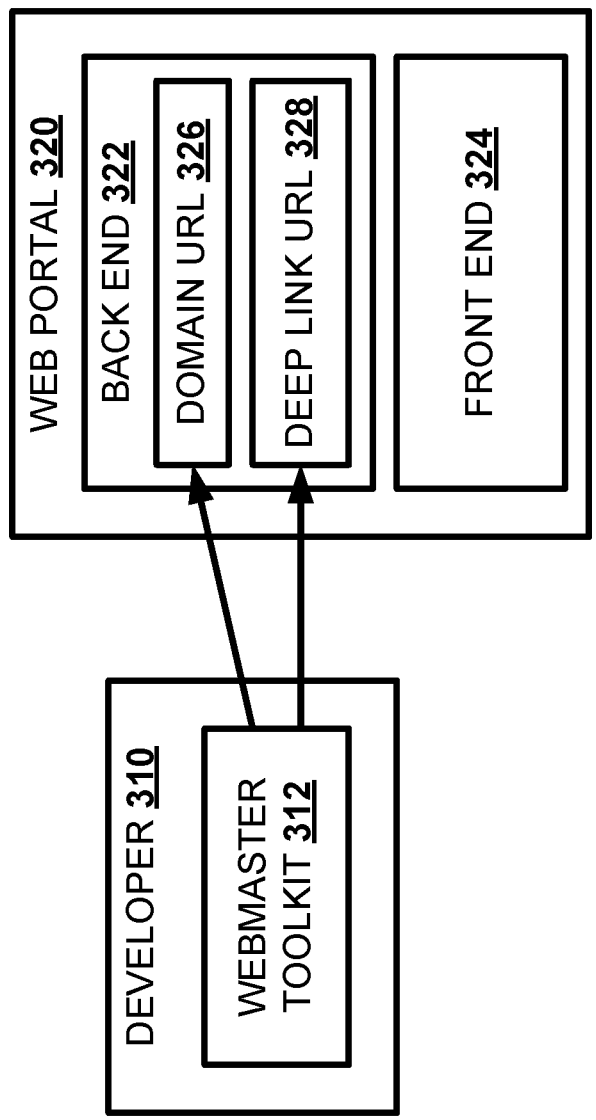
FIG. 3 illustrates, in a block diagram, one example of a developer interface architecture.

FIG. 3 illustrates, in a block diagram, one example of a developer interface architecture 300. A developer associated with a domain of a website may operate a developer device 310. The developer device 310 may execute a webmaster toolkit 312 to access a web portal 320 connected to the assistant support server. The developer device 310 may provide to the web portal 320 a login credential identifying the developer and the associated domain. The web portal 320 may use the login credential to authenticate the developer is associated with the identified domain. The developer device 310 may use the webmaster toolkit 312 to submit an assistant rule to the web portal 320. The assistant rule may associate an input word set matching a user input received from a user device with a deep link at the domain.

The web portal 320 may provide a backend 322 for interfacing with the developer and a frontend 324 for interfacing with the user device. The backend 322 may associate a domain uniform resource locator (URL) 326 with one or more deep link uniform resource locators 328. The backend 322 may store an assistant rule for a domain received from a developer device 310 associated with that domain.

Figure 4:
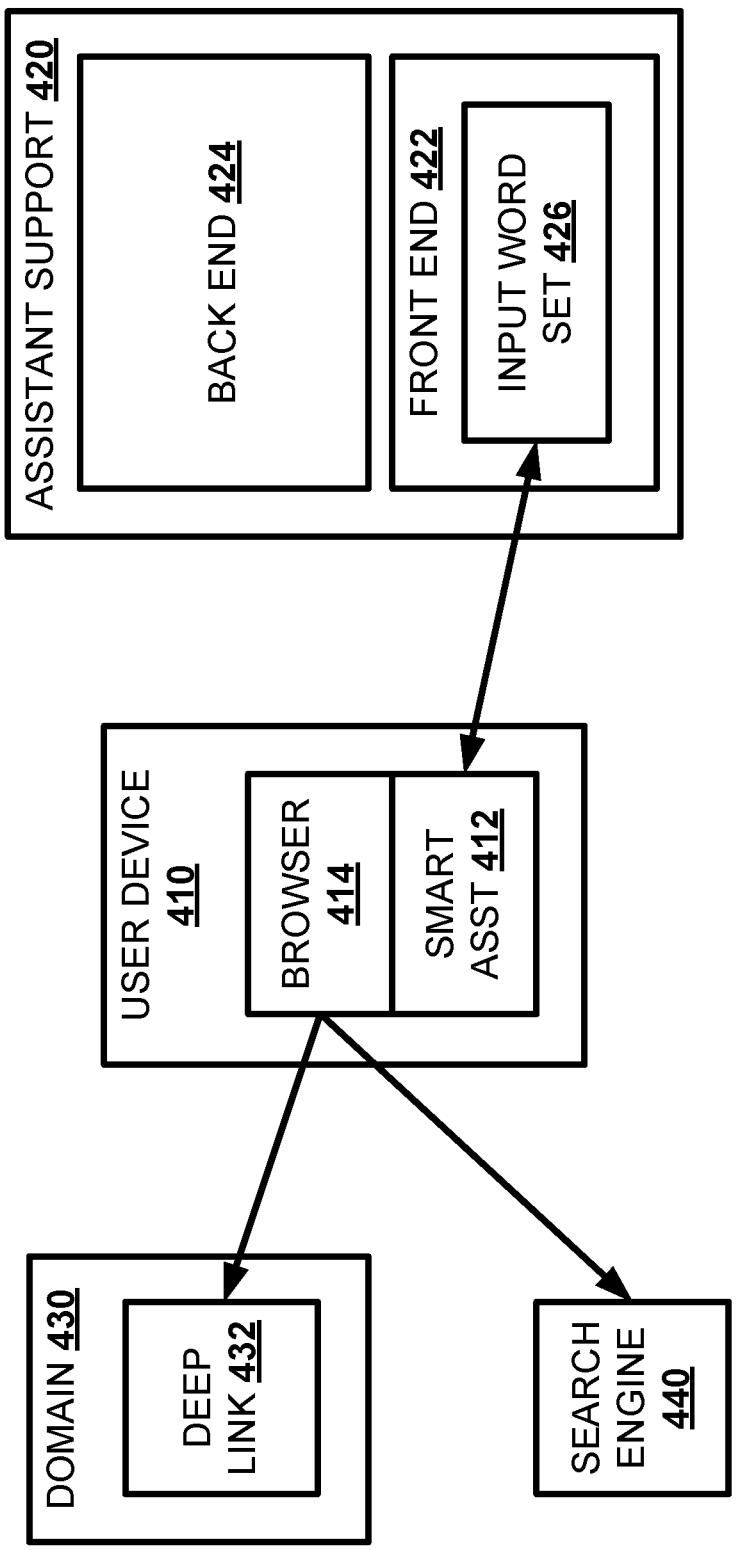
FIG. 4 illustrates, in a block diagram, one example of a user device interface architecture.

FIG. 4 illustrates, in a block diagram, one example of a user device interface architecture 400. A user device 410 may execute a smart assistant module 412 to provide access to various application to the user. The user device 410 may receive a user input, such as a verbal user input or a text user input, from the user. The user device 410 may connect to an assistant support server 420 executing a frontend interface 422 via a data network. The assistant support server 420 may interface with a backend 424 storing one or more assistant rules submitted by domain developers. The smart assistant module 412 may send the user input to the assistant support server 420 for processing. The smart assistant module 412 may indicate to the frontend interface 422 if the user device 410 is executing a browser that is currently accessing a domain 430. Alternately, the frontend interface 422 may parse the user input to identify a domain contained therein. The frontend interface 422 may compare the user input to one or more input word sets 426 in the assistant rules provided by the domain developers. The frontend interface 422 may send a user directive to the smart assistant module 412 proscribing a course of action based on the user input.

Based on the user directive, the smart assistant module 412 may invoke a browser module 414 on the user device 410 to access a virtual network location. Alternately, the smart assistant module 412 may perform an action described by the user directive by invoking a different application, such as a domain specific application. The browser module 414 may access a deep link 432 on the domain 430 indicated in the user directive. Alternately, if the frontend interface 422 did not find a match for the user input, the browser module 414 may provide the user input to a search engine 440 to find a virtual network location that responds to the user input.

FIG. 5 illustrates, in a block diagram, one example of an assistant rule 500. The assistant rule 500 may have a developer identifier (ID) 510 identifying the developer providing the assistant rule 500. The developer identifier 510 may have an associated developer weight 512. The developer weight 512 is a value indicating a relative prominence of the developer. The assistant rule 500 may associate a domain field 520 with the developer identifier 510 indicating the website produced by the developer.

The assistant rule 500 may have an input word set field 530 listing a set of one or more input words 532 that may be hypothetically provided by the user to the smart assistant module. The assistant rule 500 may associate a word weight 534 with each individual word 532. The word weight 534 is a value indicating the relative value of a word 532 in the input word set field 530 in comparison to the other words 532 in the input word set. The word weight 534 may be dynamic based on the proximity of the word 532 to other words 532 in the input word set, so that certain words 532 may have a greater word weight 534 when closer to specific other words 532. The assistant support server may use the word weight 532 to assist in comparing the input word set to a user input from the smart assistant module. The assistant support server may factor the word weight 532 when calculating a confidence score that the user input matches the input word set.

The assistant rule 500 may associate the input word set field 530 with a deep link 540. The assistant support server may direct a smart assistant module to access the deep link 540 upon receiving a user input that matches the input word set. The assistant rule 500 may associate the input word set field 530 with an action field 550 describing an action to be taken by the smart assistant module, such as accessing a user account, finding a geographic location, or calling a telephone number. The developer may describe the action when submitting the assistant rule 500. Alternately, the assistant support server may track an action performed by the domain at the deep link 540 and add a description of the action to the assistant rule 500.

The assistant rule 500 may have a rule weight 560. The rule weight 560 is value indicating the relative probability of the assistant rule 500 being used. The assistant support server may generate the rule weight 560 based on the developer weight 512. The assistant support server may use the rule weight 560 to identify an assistant rule 500 if a user input matches more than one assistant rule 500. The assistant support server may adjust the rule weight 560 based on a successful interaction with the smart assistant module. For example, if the user resubmits a request, the assistant support server may lower the rule weight 560.

Figure 6:
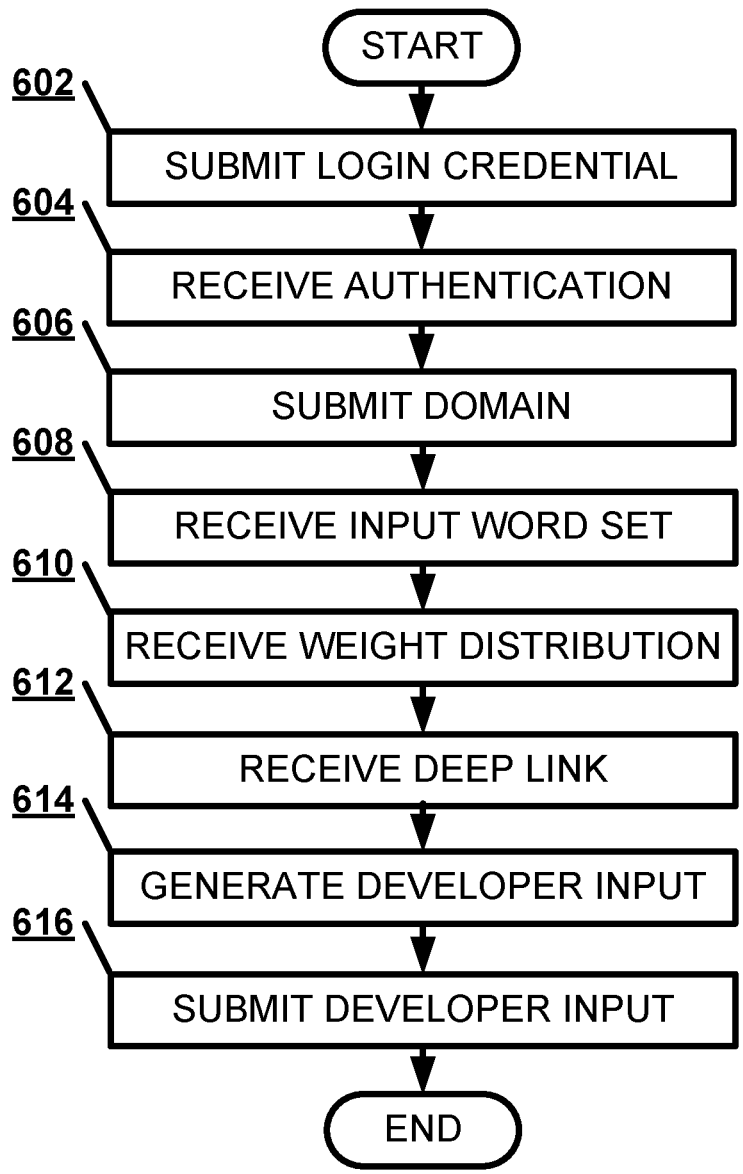
FIG. 6 illustrates, in a flowchart, one example of a method of providing a deep link of a website to a web portal with a developer device.

FIG. 6 illustrates, in a flowchart, one example of a method 600 of providing a deep link to a web portal with a developer device. The developer device may submit a login credential for the developer to the assistant support server (Block 602). The developer device may receive authentication from the assistant support server (Block 604). The developer device may submit an associated domain to the assistant support server (Block 606). The developer device may receive an input word set from the developer (Block 608). The developer device may receive a word weight distribution for the input word set from the developer (Block 610). The developer device may receive from the developer a deep link for a website associated with the input word set (Block 612). The developer device may generate a developer input describing the relationship between the input word set and the deep link (Block 614). The developer device may submit the developer input to the assistant support server (Block 616).

Figure 7:
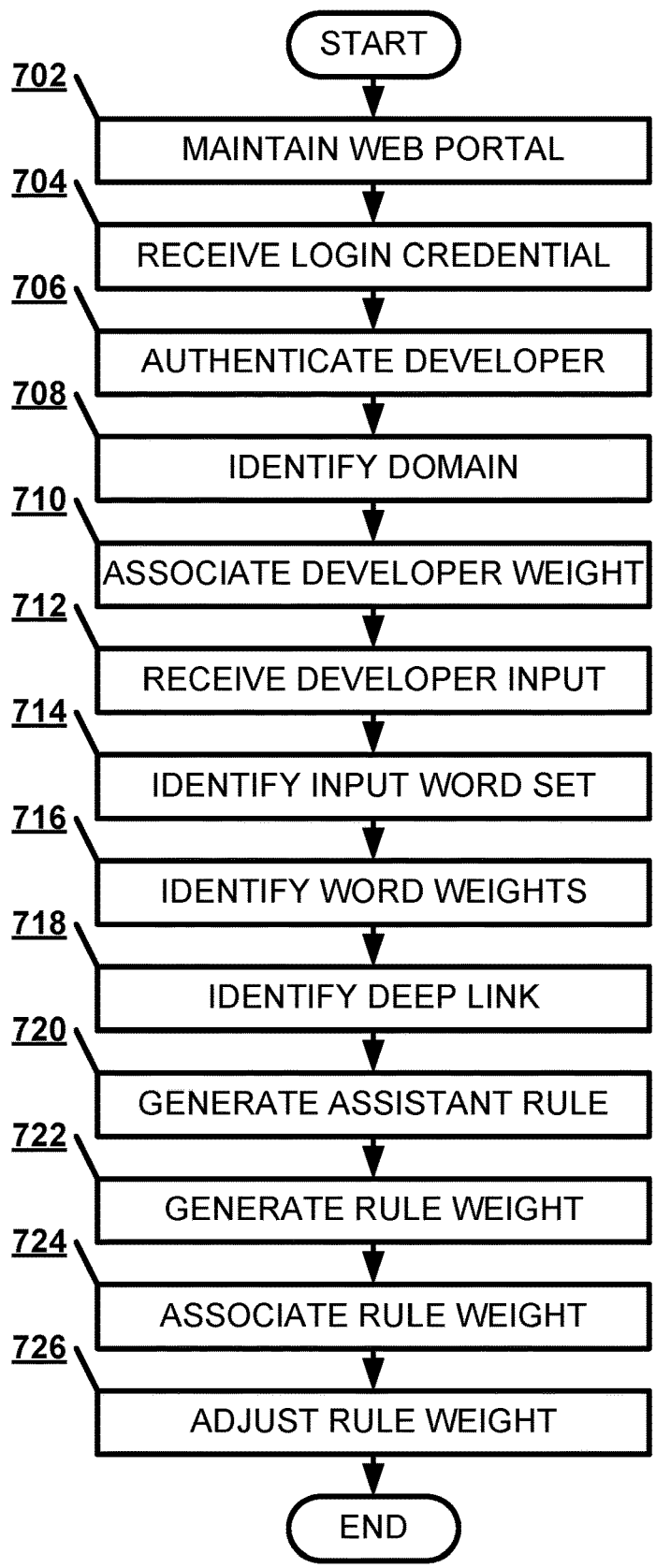
FIG. 7 illustrates, in a flowchart, one example of a method of receiving an assistant rule for a deep link of a website in a web portal.

FIG. 7 illustrates, in a flowchart, one example of a method 700 of receiving an assistant rule for a deep link in a web portal. An assistant support server may maintain a web portal accessible by a developer device (Block 702). The web portal may receive a login credential associated with a website from a developer device (Block 704). The web portal may authenticate a developer identifier in the login credential associated with the website (Block 706). The web portal may identify a domain for the website associated with the developer identifier (Block 708). The web portal may associate a developer identifier with the developer weight indicating relative prominence (Block 710).

The web portal may receive in the web portal a developer input associating an input word set describing a hypothetical user input with a deep link for the website (Block 712). The assistant support server may identify the input word set (Block 714). The assistant support server may identify a word weight for each word in the input word set (Block 716). The assistant support server may identify a deep link for the website (Block 718).

The assistant support server may generate an assistant rule associating the input word set with the deep link (Block 720). The assistant support server may generate a rule weight describing a rule applicability likelihood based on a developer weight indicating relative prominence (Block 722). The assistant support server may associate the assistant rule with a rule weight describing a rule applicability likelihood (Block 724). The assistant support server may adjust the rule weight based on a secondary developer proposal (Block 726). For example, if a second developer proposes the same deep link in response to the same input word set, the assistant support server may increase the rule weight.

Figure 8:
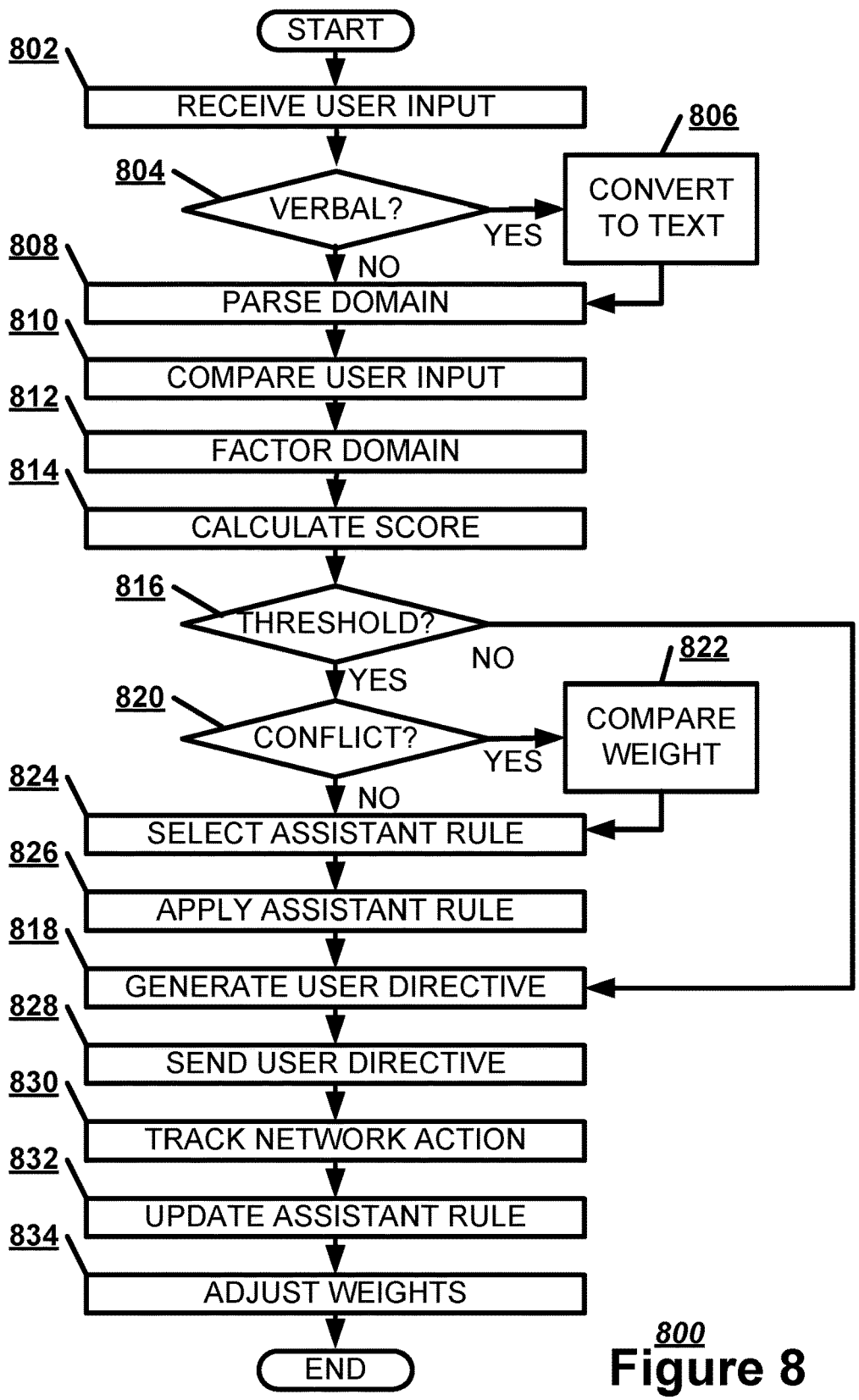
FIG. 8 illustrates, in a flowchart, one example of a method of responding to a user input to a smart assistant module at the assistant support server with a deep link to a web site.

FIG. 8 illustrates, in a flowchart, one example of a method 800 of responding to an input to a smart assistant module at the assistant support server with a deep link. The assistant support server may receive a user input from a user device (Block 802). If the user input is a verbal user input (Block 804), the assistant support server may convert the verbal user input from the user device to a text user input (Block 806). The assistant support server may parse a domain identified in the user input (Block 808).

The assistant support server may compare the user input from the user device to each input word set from each assistant rule (Block 810). The assistant support server may factor the domain from the user input into the comparison (Block 812). The assistant support server may calculate a confidence score based on a comparison of the user input and the input word set for each assistant rule (Block 814). If no assistant rule has a confidence score above a matching threshold (Block 816), the assistant support server may generate a null user directive indicating no match found to be sent to the user device (Block 818). If a conflict occurs because more than one assistant rule has a similar confidence score (Block 820), the assistant support server may compare the rule weights between the conflicting assistant rules (Block 822). The assistant support server may select the assistant rule with the optimal confidence score and rule weight (Block 824). The assistant support server may apply the assistant rule to generate a user directive (Block 826). The assistant support server may generate a user directive instructing a smart assistant module executed by the user device to connect to the associated deep link in response to receiving the input word set (Block 818). The assistant support server may send the user directive to the smart assistant module to direct the smart assistant module to access a deep link for the website in response to the user input (Block 828).

The assistant support server may track any network-enhanced action performed by the deep link in response to the user input (Block 830). The assistant support server may update the assistant rule to associate a network-enhanced action performed by the deep link with the input word set (Block 832). The assistant support server may adjust the rule weight and the developer weight based on a user response (Block 834).

Figure 9:
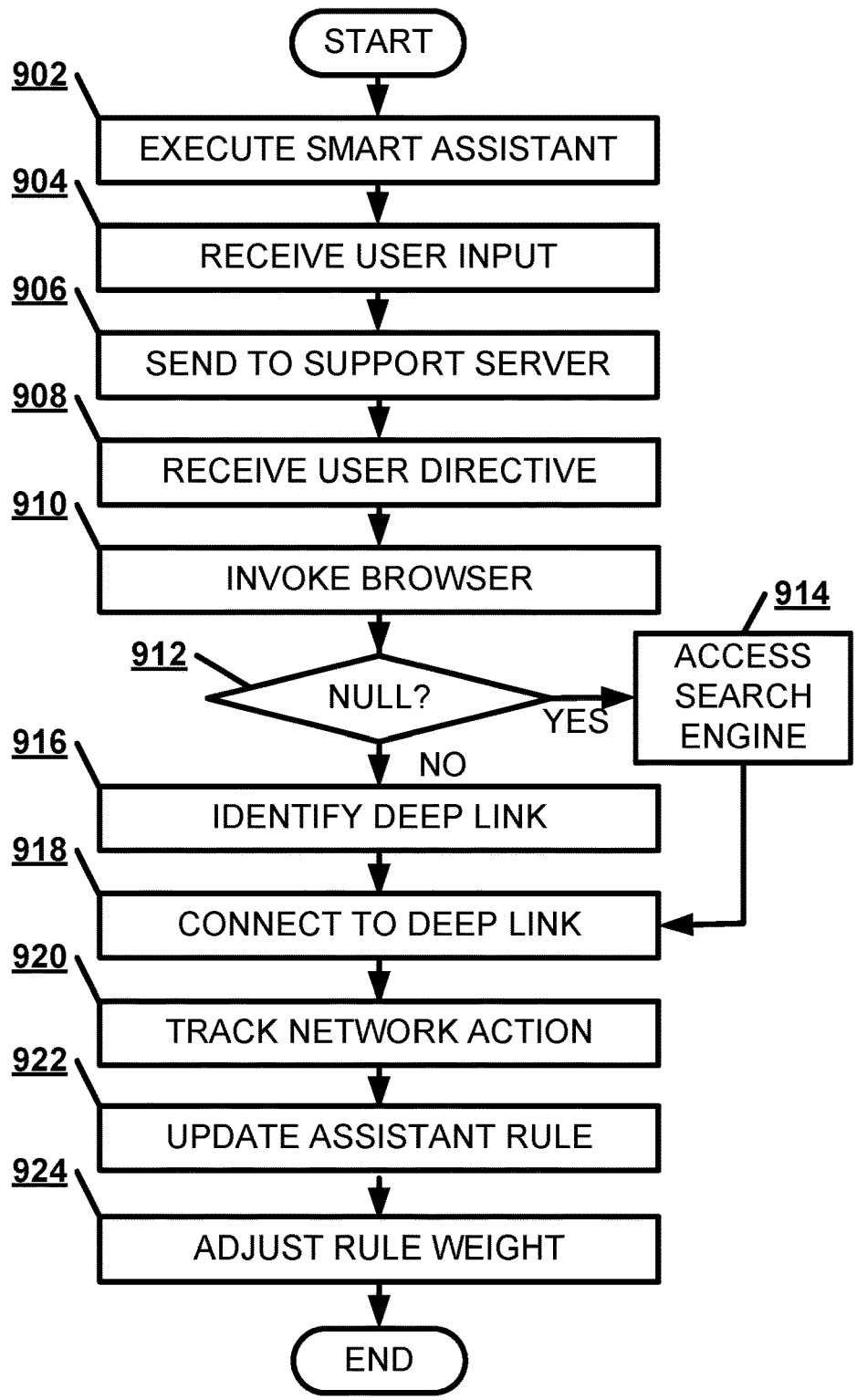
FIG. 9 illustrates, in a flowchart, one example of a method of responding to a user input to a smart assistant module at the user device with a deep link to a website.

FIG. 9 illustrates, in a flowchart, one example of a method 900 of responding to an input to a smart assistant module at the user device with a deep link. The user device may execute a smart assistant module (Block 902). The smart assistant module may receive a user input (Block 904). The smart assistant module may send the user input to an assistant support server (Block 906).

The smart assistant module may receive a user directive identifying a deep link of a website from the assistant support server based on a comparison of the user input to an input word set of an assistant rule provided by a developer input (Block 908). The smart assistant module may invoke a browser module or other web-connected application on the user device (Block 910). If the user directive is a null user directive (Block 912), the browser may access a search engine to search for a representative deep link for the user input upon receiving a null user directive (Block 914). Otherwise, the smart assistant module may identify a deep link of a website in the user directive (Block 916). The browser may connect to the deep link of the website based on the user directive (Block 918). The smart assistant module may track a network-enhanced action performed by the deep link in response to the user input (Block 920). The smart assistant module may update the assistant rule with a network-enhanced action performed by the deep link in response to the user input (Block 922). The smart assistant module may adjust a rule weight based on a user response (Block 924).

Figure 10:
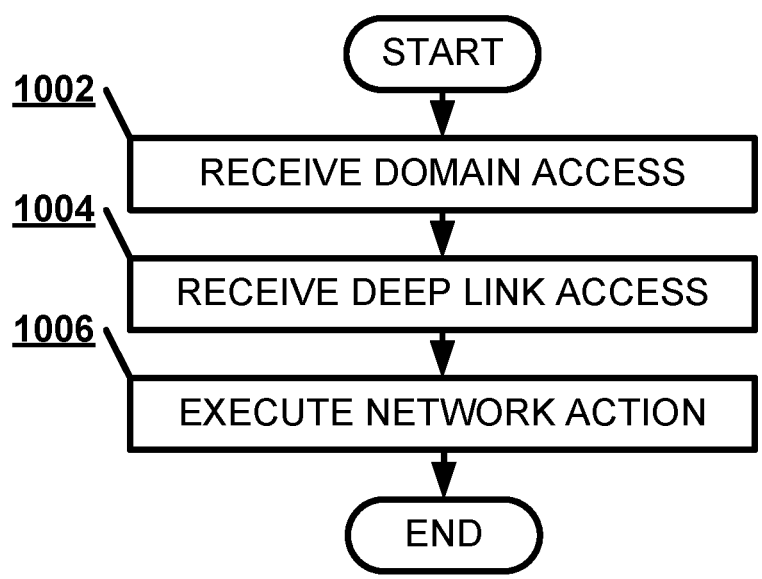
FIG. 10 illustrates, in a flowchart, one example of a method of responding to an input to a smart assistant module at the website with a network-enhanced action.

FIG. 10 illustrates, in a flowchart, one example of a method 1000 of responding to an input to a smart assistant module at a website server with a network-enhanced action. The website server may receive a domain access from a user device executing a browser (Block 1002). The website server may receive a deep link access from the browser (Block 1004). The website server may execute a network-enhanced action based on a user input for a smart assistant module (Block 1006).

Figure 11:
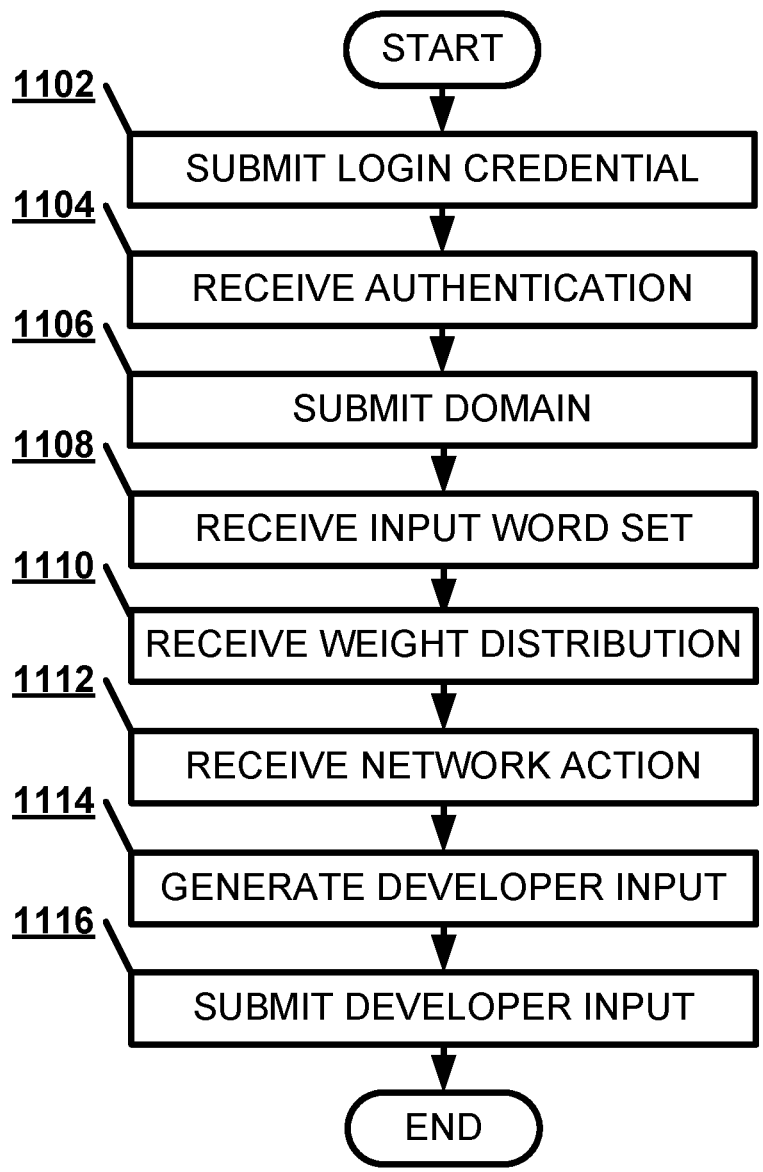
FIG. 11 illustrates, in a flowchart, one example of a method of providing a network-enhanced action to a web portal with a developer device.

Alternately, the developer may identify a network-enhanced action for the input word set. FIG. 11 illustrates, in a flowchart, one example of a method 1100 of providing a network-enhanced action to a web portal with a developer device. The developer device may submit a login credential for the developer to the assistant support server (Block 1102). The developer device may receive authentication from the assistant support server (Block 1104). The developer device may submit an associated domain to the assistant support server (Block 1106). The developer device may receive an input word set from the developer (Block 1108). The developer device may receive a word weight distribution for the input word set from the developer (Block 1110). The developer device may receive a network-enhanced action implemented by a smart assistant module executed by a user device from the developer (Block 1112). The developer device may generate a developer input describing the relationship between the input word set and the network-enhanced action (Block 1114). The developer device may submit the developer input to the assistant support server (Block 1116).

Figure 12:
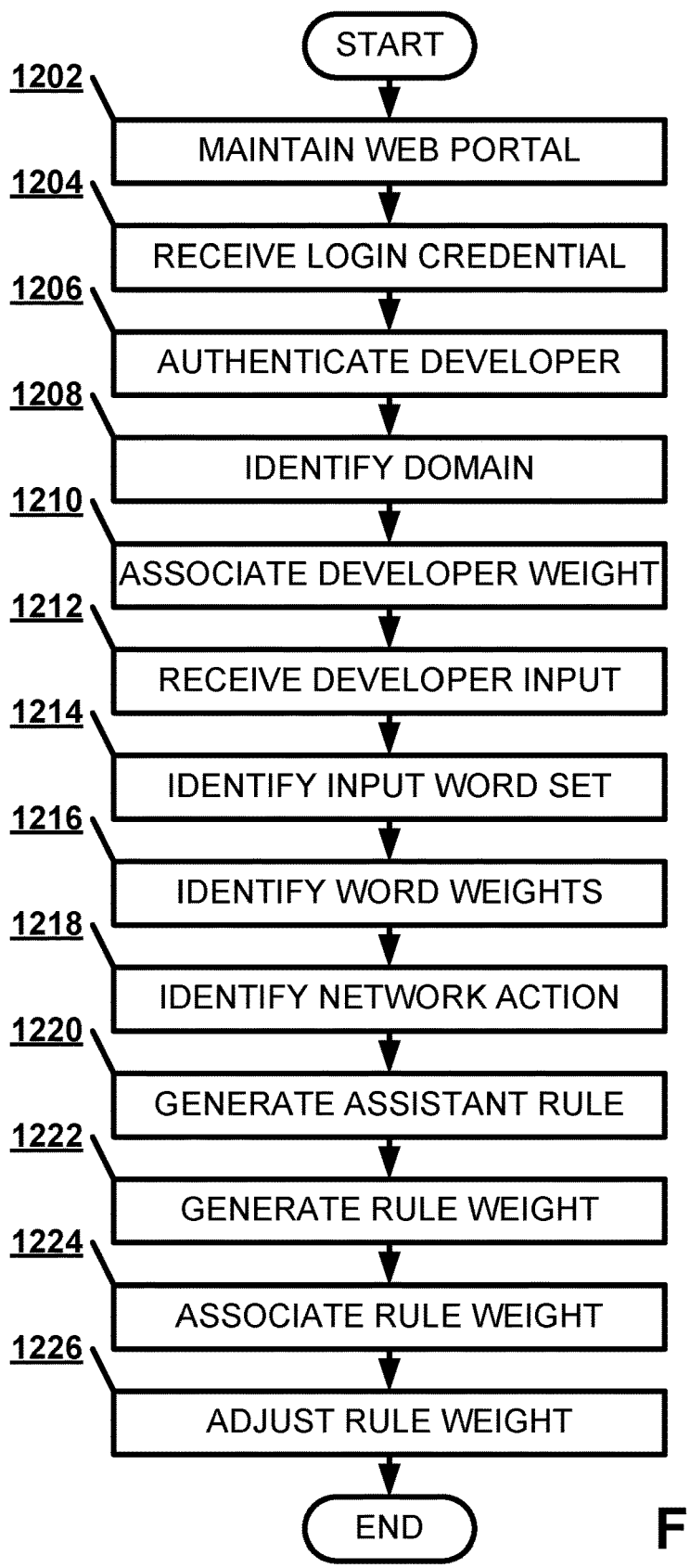
FIG. 12 illustrates, in a flowchart, one example of a method of receiving an assistant rule for a network-enhanced action in a web portal.

FIG. 12 illustrates, in a flowchart, one example of a method 1200 of receiving an assistant rule for a network-enhanced action in a web portal. An assistant support server may maintain a web portal accessible by a developer device (Block 1202). The web portal may receive a login credential associated with a website for performing the network-enhanced action from a developer device (Block 1204). The web portal may authenticate a developer identifier associated with a website for performing the network-enhanced action in the login credential associated with the website (Block 1206). The web portal may identify a domain for the website associated with the developer identifier (Block 1208). The web portal may associate the developer identifier with a developer weight indicating relative prominence (Block 1210).

The web portal may receive a developer input associating an input word set describing a hypothetical user input with a network-enhanced action implemented by a smart assistant module executed by a user device in response to the input word set (Block 1212). The assistant support server may identify the input word set (Block 1214). The assistant support server may identify a word weight for each word in the input word set (Block 1216). The assistant support server may identify a network-enhanced action implemented by a smart assistant module executed by a user device in response to the input word set (Block 1218).

The assistant support server may generate an assistant rule associating the input word set with the network-enhanced action (Block 1220). The assistant support server may generate a rule weight describing a rule applicability likelihood based on the developer weight indicating relative prominence (Block 1222). The assistant support server may associate the assistant rule with a rule weight describing a rule applicability likelihood (Block 1224). The assistant support server may adjust the rule weight based on a secondary developer proposal (Block 1226). For example, if a second developer proposes the same network-enhanced action in response to the same input word set, the assistant support server may increase the rule weight.

Figure 13:
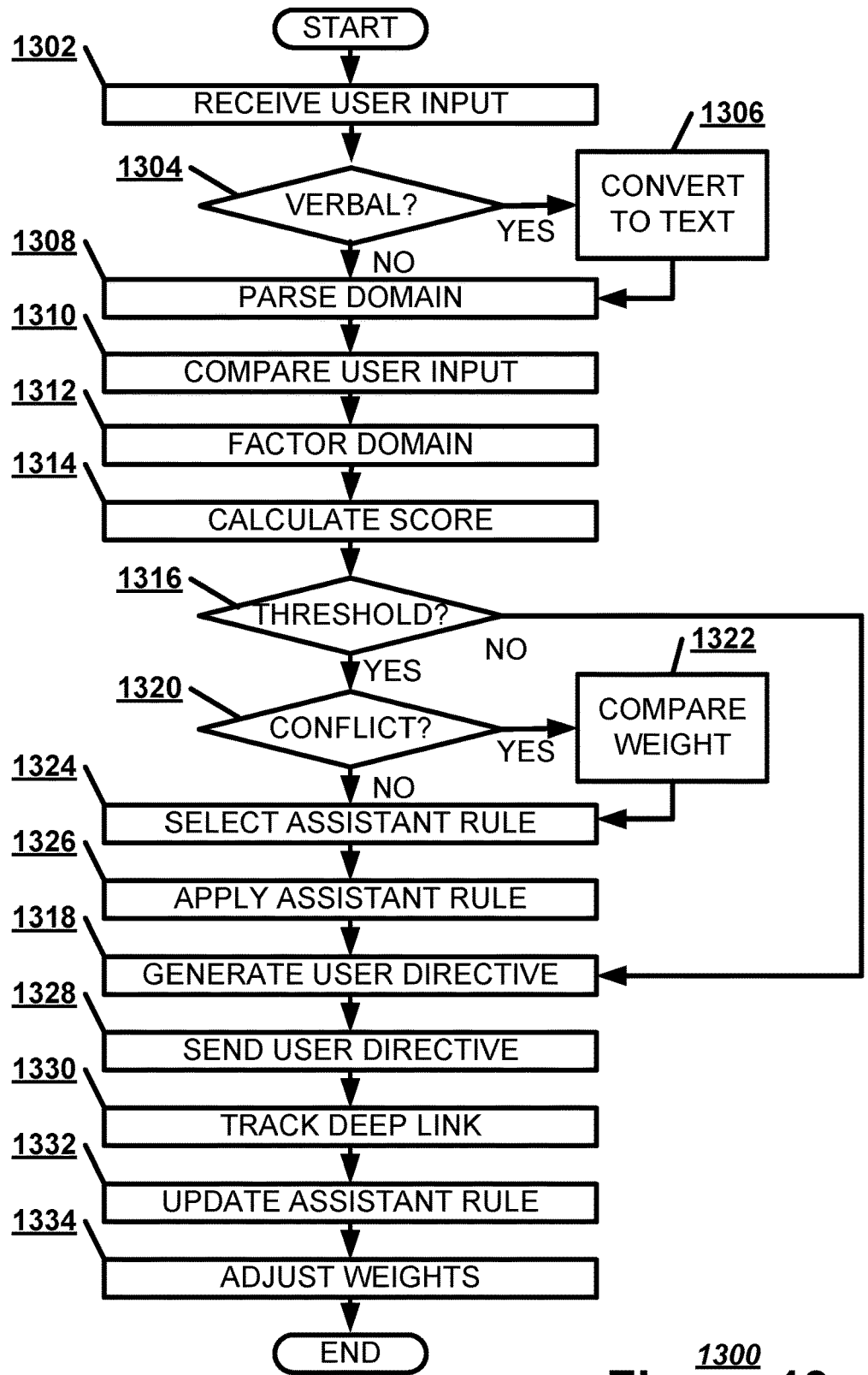
FIG. 13 illustrates, in a flowchart, one example of a method of responding to a user input to a smart assistant module at the assistant support server with a network-enhanced action.

FIG. 13 illustrates, in a flowchart, one example of a method 1300 of responding to an input to a smart assistant module at the assistant support server with a network-enhanced action. The assistant support server may receive a user input from a user device (Block 1302). If the user input is a verbal user input (Block 1304), the assistant support server may convert the verbal user input from the user device to a text user input (Block 1306). The assistant support server may parse a domain identified in the user input (Block 1308).

The assistant support server may compare the user input to each input word set from each assistant rule (Block 1310). The assistant support server may factor the domain from the user input into the comparison (Block 1312). The assistant support server may calculate a confidence score based on a comparison of the user input and the input word set for each assistant rule (Block 1314). If no assistant rule has a confidence score above a matching threshold (Block 1316), the assistant support server may generate a null user directive to be sent to the user device (Block 1318). If a conflict occurs because more than one assistant rule has a similar confidence score (Block 1320), the assistant support server may compare the rule weights between the conflicting assistant rules (Block 1322). The assistant support server may select the assistant rule with the optimal confidence score and rule weight (Block 1324). The assistant support server may apply the assistant rule to generate a user directive (Block 1326). The assistant support server may generate a user directive instructing a smart assistant module executed by the user device to perform the network-enhanced action in response to receiving a user input from the smart assistant module matching the input word set (Block 1318). The assistant support server may send the user directive to the smart assistant module (Block 1328).

The assistant support server may track any deep link of the website accessed as part of performing the network-enhanced action in response to the user input (Block 1330). The assistant support server may update the assistant rule to associate a deep link of the website with the network-enhanced action (Block 1332). The assistant support server may adjust the rule weight and the developer weight based on a user response (Block 1334).

Figure 14:
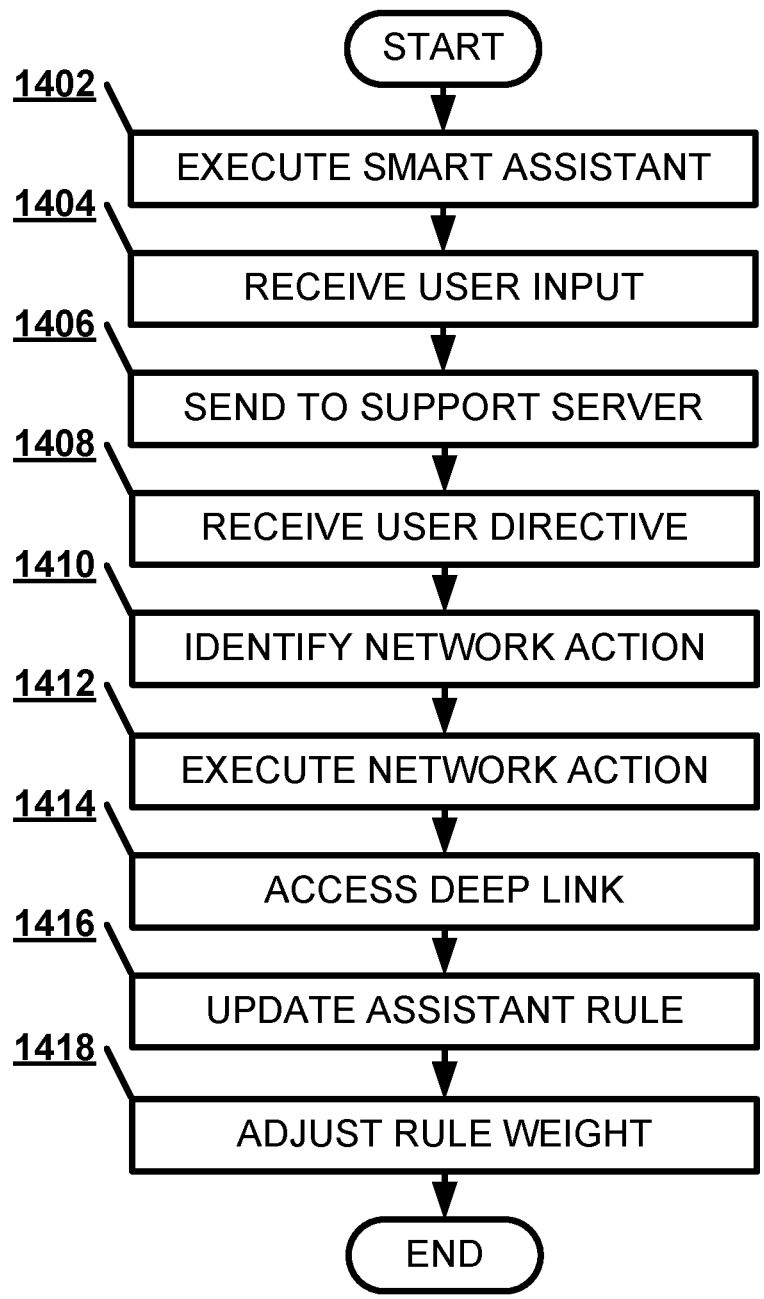
FIG. 14 illustrates, in a flowchart, one example of a method of responding to a user input to a smart assistant module at the user device with a network-enhanced action.

FIG. 14 illustrates, in a flowchart, one example of a method 1400 of responding to an input to a smart assistant module at the user device with a network-enhanced action. The user device may execute a smart assistant module (Block 1402). The smart assistant module may receive a user input (Block 1404). The smart assistant module may send the user input to an assistant support server (Block 1406).

The smart assistant module may receive a user directive from the assistant support server based on a comparison of the user input to an input word set of an assistant rule provided by a developer input (Block 1408). The smart assistant module may identify a network-enhanced action based on the user directive (Block 1410). The smart assistant module may execute a network-enhanced action in response to the user directive (Block 1412). The smart assistant module may access a deep link as part of a network-enhanced action (Block 1414). The smart assistant module may update the assistant rule with a deep link for a website performing a network-enhanced action in response to the user input (Block 1416). The smart assistant module may adjust a rule weight based on a user response (Block 1418).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. An assistant support server, comprising:
   a processing core having at least one processor configured to maintain a web portal accessible by a developer device, and authenticate, via the web portal, the developer device based on a login credential received from the developer device;
   memory configured to store, via the web portal and based on authenticating the developer device, an assistant rule based on an input, from a developer device, associating an input word set describing a hypothetical user input with a deep link for a website; and
   a communication interface configured to receive the login credential from the developer device, receive, in the web portal and based on authenticating the developer device, the input from the developer device, and to instruct a smart assistant module executed by a user device to connect to the deep link in response to receiving a user input from the smart assistant module matching the input word set,
   wherein the at least one processor is further configured to:
      track an action performed, in response to the user input, by a domain of the website; and
      update the assistant rule to reflect the action so that the action is performed in response to the user input.

2. The assistant support server of claim 1, wherein the communication interface is configured to receive the login credential, which is associated with the website, from the developer device.

3. The assistant support server of claim 1, wherein the processing core is configured to authenticate a developer identifier associated with the website.

4. The assistant support server of claim 1, wherein the memory is configured to associate a domain for the website with a developer identity.

5. The assistant support server of claim 1, wherein the processing core is configured to convert a verbal user input from the user device to a text user input.

6. The assistant support server of claim 1, wherein the processing core is configured to parse a domain identified in the user input.

7. The assistant support server of claim 1, wherein the processing core is configured to calculate a confidence score based on a comparison of the user input and the input word set.

8. The assistant support server of claim 1, wherein the communication interface is configured to track at the deep link a network-enhanced action performed in response to the user input.

9. The assistant support server of claim 1, wherein the memory is configured to associate a network-enhanced action performed by the deep link with the input word set in the assistant rule.

10. The assistant support server of claim 1, wherein the communication interface is configured to instruct the smart assistant module to perform a network-enhanced action in response to the user input.

11. The assistant support server of claim 1, wherein the at least one processor is further configured to:
    receive, from a second developer device, a second input associating the input word set with the deep link for the web site; and
    update, based on receiving the second input, a rule weight associated with the assistant rule.

12. A computing device, having a memory to store a series of instructions that are executed by at least one processor to implement a web portal for an assistant support server, the computing device configured to:
    authenticate, via the web portal, a developer device based on a login credential received from the developer device;
    receive, in the web portal and based on authenticating the developer device, an input, from the developer device, associating an input word set describing a hypothetical user input with a network-enhanced action implemented by a smart assistant module at a deep link of a website and executed by a user device in response to the input word set;

generate an assistant rule associating the input word set with the network-enhanced action;

generate a user directive instructing the smart assistant module to perform the network-enhanced action in response to receiving a user input from the smart assistant module matching the input word set; and send the user directive to the smart assistant module, wherein the computing device is further configured to:

track an action performed, in response to the user input, by a domain of the website; and update the assistant rule to reflect the action so that the action is performed in response to the user input.

13. The computing device of claim 12, wherein the computing device is further configured to receive the login credential, which is associated with a website for performing the network-enhanced action.

14. The computing device of claim 12, wherein the computing device is further configured to authenticate a developer identifier associated with a website for performing the network-enhanced action.

15. The computing device of claim 12, wherein the computing device is further configured to convert a verbal user input from the user device to a text user input.

16. The computing device of claim 12, wherein the computing device is further configured to parse a domain identified in the user input.

17. The computing device of claim 12, wherein the computing device is further configured to calculate a confidence score based on a comparison of the user input and the input word set.

18. The computing device of claim 12, wherein the computing device is further configured to track a deep link of a web site performing the network-enhanced action in response to the user input.

19. The computing device of claim 12, wherein the computing device is further configured to update the assistant rule to associate a deep link of the website with the network-enhanced action.

20. A machine-implemented method, comprising:

executing a smart assistant module on a user device;

receiving a user input in the smart assistant module;

sending the user input to an assistant support server;

receiving a user directive from the assistant support server based on a comparison of the user input to an input word set of an assistant rule provided by a developer input; connecting to a deep link of a web site based on the user directive;

tracking an action performed, in response to the user input, by a domain of the website; and updating the assistant rule to reflect the action so that the action is performed in response to the user input, wherein the input word set and the deep link of the website are received, via a web portal, from a developer device authenticated to specify the input word set and the deep link of the website in the web portal.

21. The method of claim 20, further comprising:

accessing a search engine to search for a representative deep link for the user input upon receiving a null user directive.

* * * * *